(12) United States Patent
Kappelman

(10) Patent No.: US 10,736,272 B2
(45) Date of Patent: *Aug. 11, 2020

(54) MATERIAL WRAP SYSTEM WITH AUTOMATIC DRIVE TENSION COMPENSATION

(71) Applicant: Deere & Company, Moline, IL (US)

(72) Inventor: Jacob D. Kappelman, Bloomfield, IA (US)

(73) Assignee: DEERE & COMPANY, Moline, IL (US)

(*) Notice: Subject to any disclaimer, the term of this patent is extended or adjusted under 35 U.S.C. 154(b) by 197 days.

This patent is subject to a terminal disclaimer.

(21) Appl. No.: 15/917,242

(22) Filed: Mar. 9, 2018

(65) Prior Publication Data

US 2019/0274255 A1 Sep. 12, 2019

(51) Int. Cl.
| | |
|---|---|
| *B65B 11/00* | (2006.01) |
| *B65B 41/12* | (2006.01) |
| *B65B 41/16* | (2006.01) |
| *A01F 15/07* | (2006.01) |
| *A01F 15/12* | (2006.01) |
| *B65B 11/04* | (2006.01) |
| *B65B 27/12* | (2006.01) |

(52) U.S. Cl.
CPC ........ *A01F 15/0715* (2013.01); *A01F 15/12* (2013.01); *B65B 11/04* (2013.01); *B65B 27/12* (2013.01); *B65B 27/125* (2013.01); *B65B 41/16* (2013.01); *A01F 2015/072* (2013.01); *A01F 2015/076* (2013.01)

(58) Field of Classification Search
USPC .......... 53/397, 399, 461–466, 580, 587–588, 53/203, 210, 211, 389.1–389.5, 64–74; 279/19
See application file for complete search history.

(56) References Cited

U.S. PATENT DOCUMENTS

| | | | |
|---|---|---|---|
| 4,457,226 A * | 7/1984 | Meiers | A01F 15/141 100/13 |
| 4,729,213 A | 3/1988 | Raes | |
| 4,768,431 A | 9/1988 | Merritt, III et al. | |

(Continued)

FOREIGN PATENT DOCUMENTS

EP    0815719 A1    1/1998

OTHER PUBLICATIONS

Extended European Search Report for application No. 191599976 dated Jul. 10, 2019.
Deere & Company, U.S. Appl. No. 16/353,642, filed Mar. 14, 2019.

*Primary Examiner* — Praachi M Pathak
(74) *Attorney, Agent, or Firm* — Klintworth & Rozenblat IP LLP

(57) ABSTRACT

A system for wrapping a material in a baler includes a feed element for feeding the material through a feed path. A drive element intermittently drives the feed element. A linking element couples the drive element with the feed element. A tensioning lever operates to vary tension on the linking element to intermittently drive or not drive the feed element. A knife mechanism operates to intersect the feed path to cut the material. An actuator is engageable with the tensioning lever and with the knife mechanism. The actuator operates to move the tensioning lever and the knife mechanism independent of one another.

19 Claims, 10 Drawing Sheets

(56) References Cited

U.S. PATENT DOCUMENTS

| | | | | |
|---|---|---|---|---|
| 4,768,731 | A * | 9/1988 | Neufeld | A01K 89/0102 |
| | | | | 242/239 |
| 4,787,193 | A * | 11/1988 | Verhulst | A01F 15/0715 |
| | | | | 53/118 |
| 4,896,477 | A | 1/1990 | Wagstaff et al. | |
| 5,109,652 | A * | 5/1992 | Viaud | A01F 15/0715 |
| | | | | 53/505 |
| 5,433,059 | A * | 7/1995 | Kluver | A01F 15/0715 |
| | | | | 53/118 |
| 5,687,548 | A * | 11/1997 | McClure | A01F 15/0715 |
| | | | | 53/118 |
| 6,006,504 | A | 12/1999 | Myers et al. | |
| 7,694,491 | B2 * | 4/2010 | Noonan | A01F 15/071 |
| | | | | 100/4 |
| 10,321,632 | B2 * | 6/2019 | Jones | A01D 90/12 |
| 2014/0053510 | A1 * | 2/2014 | Smith | A01F 15/0715 |
| | | | | 53/461 |
| 2015/0047311 | A1 * | 2/2015 | Jacobson | A01F 15/0715 |
| | | | | 56/341 |
| 2017/0049058 | A1 | 2/2017 | Eubanks et al. | |
| 2018/0042181 | A1 * | 2/2018 | Chapon | F16D 49/10 |

\* cited by examiner

US 10,736,272 B2

MATERIAL WRAP SYSTEM WITH AUTOMATIC DRIVE TENSION COMPENSATION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to material wrap systems and more particularly to feed systems for wrapping crop packages, including bales of crop material formed in round balers.

BACKGROUND OF THE DISCLOSURE

In agricultural and other applications, it may be useful to wrap crop packages with wrap material. For example, certain types of wrap material can help hold crop packages together and can protect crop packages from environmental elements such as rain and other moisture sources.

In conventional baling systems, the interaction between feeding and cutting the wrap material involves a complex mechanical system that requires accurate setting and later adjustments in the field. This may reduce the time available for agricultural workers to actually gather and bale crop material. Accordingly, simplification of the required setting and adjustment actions would be beneficial.

SUMMARY OF THE DISCLOSURE

A system for controlling the feed of a wrap material is disclosed. In one aspect the system includes a feed element for feeding the material through a feed path. A drive element intermittently drives the feed element. A linking element couples the drive element with the feed element. A tensioning lever operates to vary tension on the linking element to intermittently drive or not drive the feed element. A knife mechanism operates to intersect the feed path to cut the material. An actuator is engageable with the tensioning lever and with the knife mechanism. The actuator operates to move the tensioning lever and the knife mechanism independent of one another.

According to another aspect of the disclosure, a system includes a feed roll to feed the material through a feed path. A drive pulley intermittently drives the feed roll. A belt couples the drive pulley with the feed roll. A tensioning lever rotates about a pivot to vary tension on the belt to intermittently drive or not drive the feed roll. The tensioning lever defines a catch opening. A knife mechanism includes a fixed knife, and a counter-knife. A link moves the counter-knife relative to the fixed knife, and defines a counter-knife slot. An actuator includes an actuator arm that has an actuating end with a pin. The actuator includes a drive unit that bi-directionally drives the actuator arm to move the actuating end. The pin is engageable with the tensioning lever at the catch opening and extends through the counter-knife slot of the link.

According to an additional aspect of the disclosure, a system includes a feed roll to feed the material through a feed path. A drive element intermittently drives the feed roll. A linking element couples the drive element with the feed roll. A tensioning lever is rotatable about a pivot to vary tension on the linking element to intermittently drive or not drive the feed roll. The tensioning lever includes an arm that extends from the pivot and defines a catch opening. The tensioning lever includes another arm that extends from the pivot. A knife mechanism includes a fixed blade, and a counter-knife mechanism. The counter-knife mechanism includes a link with a counter-knife end and a pivot end. The link rotates about the pivot and defines a counter-knife slot. The counter-knife is coupled with the counter-knife end. An actuator includes an actuator arm having a first end with a pin and a second end. The actuator includes a drive unit that bi-directionally drives the actuator arm. The pin engages with the tensioning lever and extends through the counter-knife slot of the link. The actuator moves the tensioning lever and the link independent of one another. A support defines a lost-motion cavity into which the second end of the actuator arm extends. A spring extends into the lost-motion cavity and biases the actuator arm toward the tensioning lever. The spring compresses when the tensioning lever provides a resistance to rotation above a threshold magnitude so that the linking element is not over tensioned.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed material wrap system, as shown in the accompanying figures of the drawings described briefly above. Various modifications to the example embodiments may be contemplated by one of skill in the art.

In one or more example implementations of the disclosed material wrap system, wrapping material is fed and cut in coordinated operations. Motion of the tensioning mechanism that controls feed and of the knife mechanism that controls cutting is separated, while both are operated by a single actuator. In addition, force output of the actuator is configured to ensure sufficient tension, while being limited to avoid over tensioning.

Figure 1:
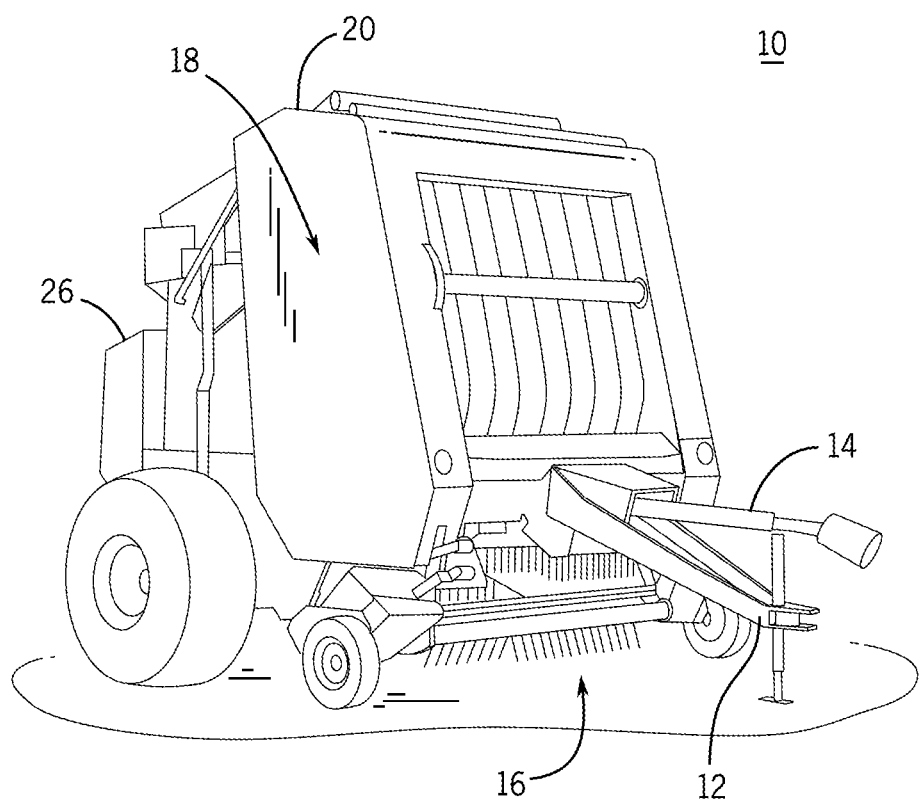
FIG. 1 is a right perspective view of an agricultural baler with which the disclosed system and method can be used.

FIG. 1 illustrates an example round baler 10 for forming crop packages configured as round bales. Various examples herein may present the disclosed material wrap system with respect to the baler 10 and the formation and wrapping of round bales. It will be understood, however, that the baler 10 is presented as an example only and that the disclosed system may be applied with respect to other round balers, other crop-packaging devices with corresponding crop packages, or various other machinery that feeds and cuts material.

In the example illustrated in FIG. 1, the baler 10 includes a tongue 12 so that baler 10 may be towed during operation by a separate vehicle (e.g., an agricultural work vehicle such as a tractor (not shown)). In certain embodiments, the baler 10 may receive power from such a vehicle via a PTO connection 14, which may be connected in various known ways to a PTO shaft of the vehicle (not shown). As the baler 10 moves (e.g., is towed) across a field, cut crop material may be gathered by an intake assembly 16 and guided into a baling chamber 18 within a frame 20 of the baler 10. Within the baling chamber 18, various rollers rotate to move belts (shown in FIG. 2), to rotate and compress the gathered crop material into a generally cylindrical (or "round") bale (not shown). Alternatively, various rollers themselves, rather than in conjunction with belts or other devices, may be used to create density and form the bale, in what may be referred to as a "fixed chamber baler."

Figure 2:
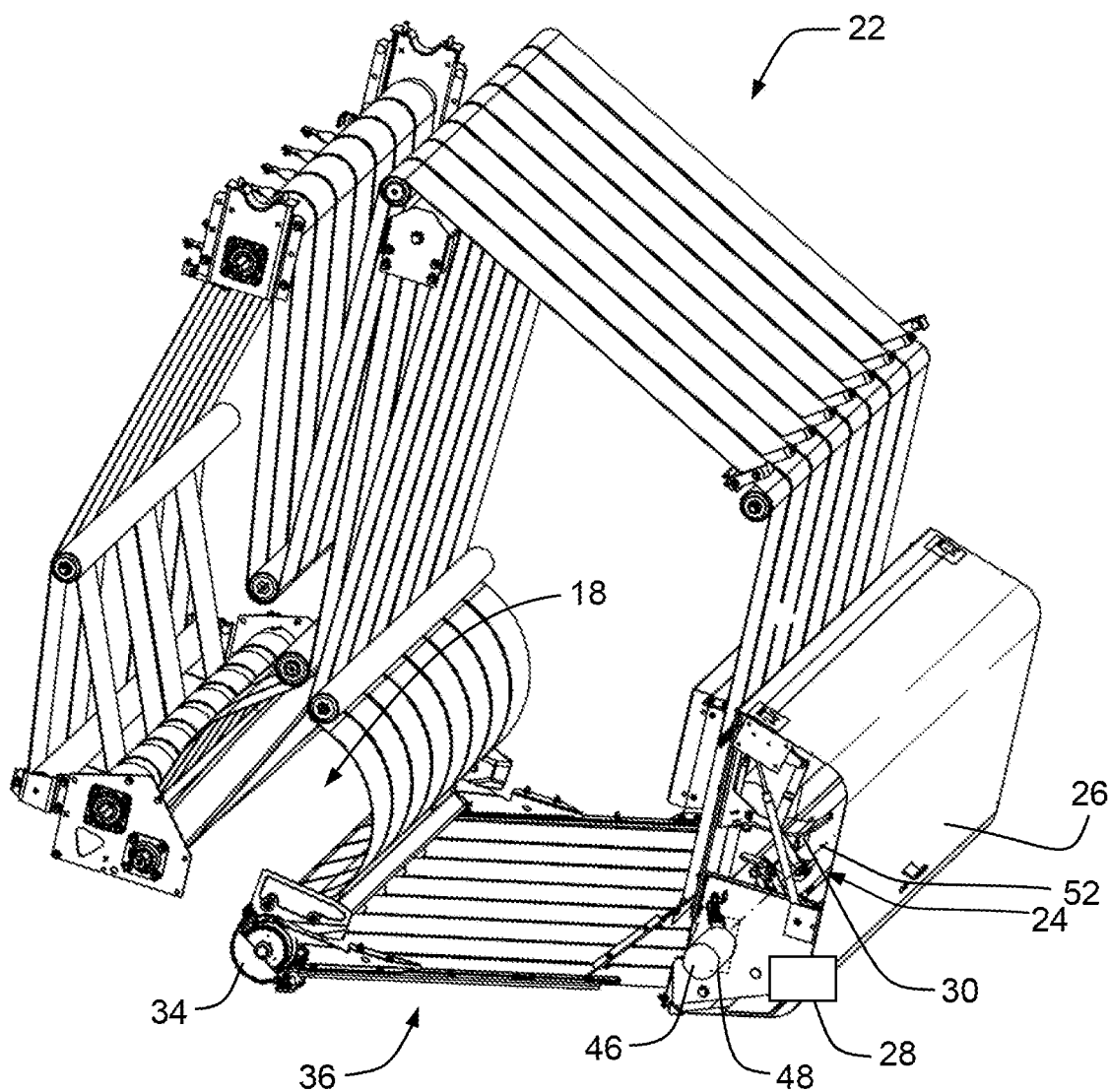
FIG. 2 is a left perspective view of certain components of the baler of FIG. 1, including a motor and a belt arrangement according to one embodiment of the disclosed system.

FIG. 2 illustrates certain internal mechanisms of the baler 10, including a belt arrangement 22 for rotating and compressing crop material into a round bale. In the embodiment illustrated, a material wrap system 24 intermittently feeds material for wrapping the bale formed by the baler 10. A part of the material wrap system 24 may be covered by a rear cover 26. It should be noted that components of the material wrap system 24 may be mounted at another location in the baler 10, for example, at the front of the baler 10 or at other locations at the rear of the baler 10, such as a higher or lower location. Also in other examples components may be interchanged between the right and left sides of the baler 10. In some embodiments, the rear cover 26 can be opened to load a roll of wrap material (shown in FIG. 3), such as netting wrap. In the current example, the material wrap system 24 includes an electrical motor 46 drawing power from an electrical system of the towing vehicle (or another power source). In other embodiments, other types of motors may be used, including hydraulic motors. Generally, the material wrap system 24 is configured to drive rotation of a feed element for feeding wrap material when needed to wrap a completed bale. In the current embodiment, the feed element is a feed roll 30, which may include an elongated roller with a resilient rubber-like outer surface for engaging the wrap material.

In some embodiments, the baler 10 (or a vehicle towing the baler 10) may include a controller 28, which can include one or more computing devices such as various processor devices and various associated memory architectures. In some embodiments, the controller 28 is in communication with various other devices of the baler 10, a vehicle towing the baler 10, or other platforms. As illustrated, the controller 28 is in communication with the material wrap system 24. The controller 28 can also be in communication with various sensors, actuators, or other devices distributed on the baler 10, or elsewhere. For example, the controller 28 may be in communication with rotational sensors on (or otherwise configured to monitor) the feed roll 30, another roller of the baler 10 (e.g., a roller 34 guiding the belt arrangement 22), the PTO connection 14, and other devices. Generally, the controller 28 (or another control device) is used to provide control functions including for moving wrap material through the machine using the feed roll 30. When a bale formed within the baling chamber 18 is ready to be wrapped, the controller 28 operates the material wrap system 24 to draw wrap material from a material roll within the cover 26 onto the feed roll 30, and then from the feed roll 30 through other elements and then onto a net pan 36. The material travels along a feed path 40 from the feed roll 30 to be carried by the belt arrangement 22 to the baling chamber 18 and onto the bale contained therein.

Figure 3:
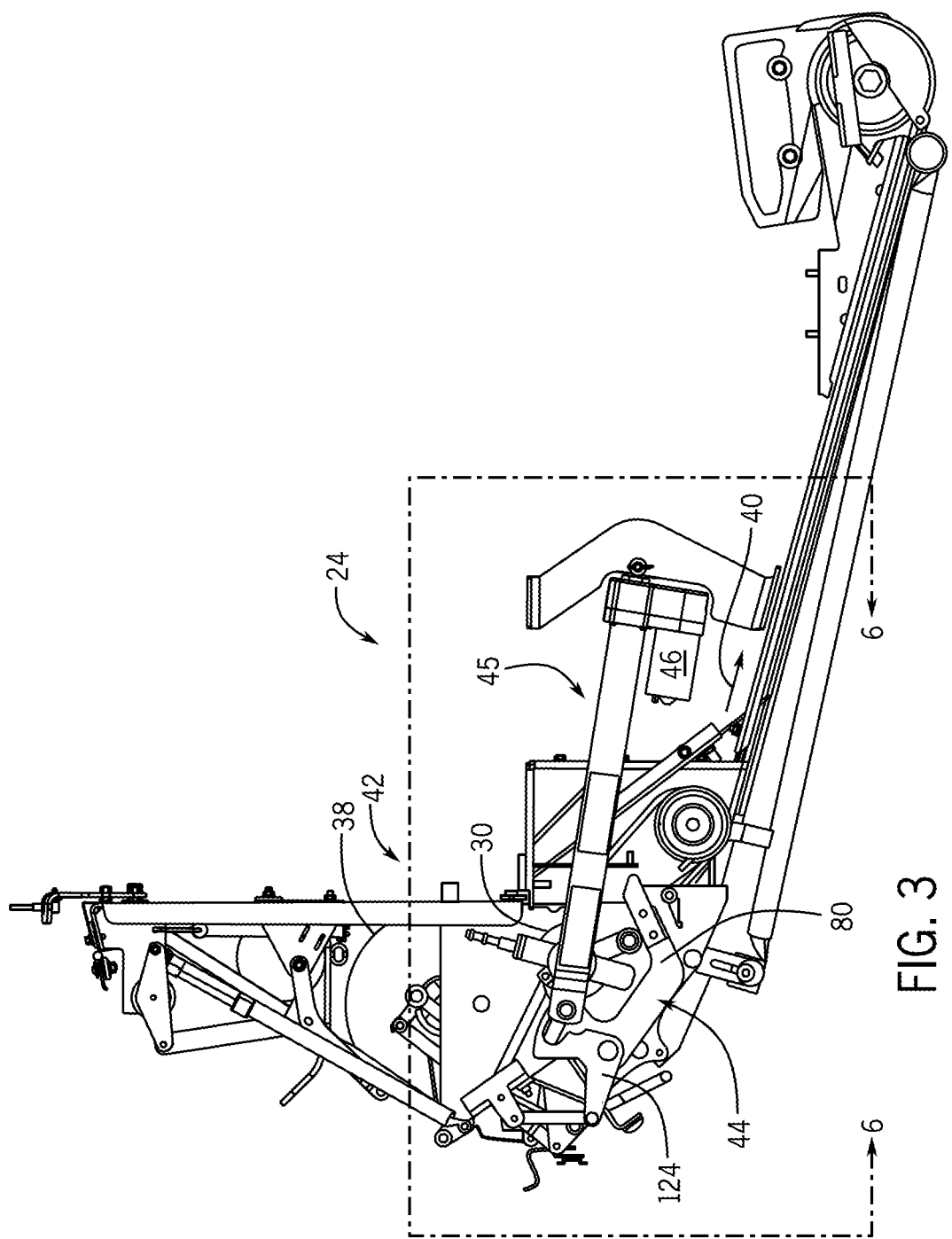
FIG. 3 is a right side elevational view of the wrap material feed area of the baler of FIG. 1, with the counter-knife in a cutting position.

Referring additionally to FIG. 3, aspects of the material wrap system 24 are shown in greater detail. A material roll 38 is shown loaded in the baler 10 in contact with the feed roll 30. As viewed in FIG. 3 from the right-hand side of the baler 10, material is fed from the bottom of the material roll 38 as it is rotated in a counter-clockwise direction by the feed roll 30. The material wrap system 24 drives the feed roll 30 clockwise (as viewed in FIG. 3), to rotate the material roll 38 in the opposite direction. Material drawn from material roll 38 is fed in a direction of the feed path 40 toward the baling chamber 18. The material wrap system 24 generally includes a material feed system 42, a knife mechanism 44 and an actuator system 45 that provides actuation functions for both the material feed system 42 and the knife mechanism 44.

Figure 4:
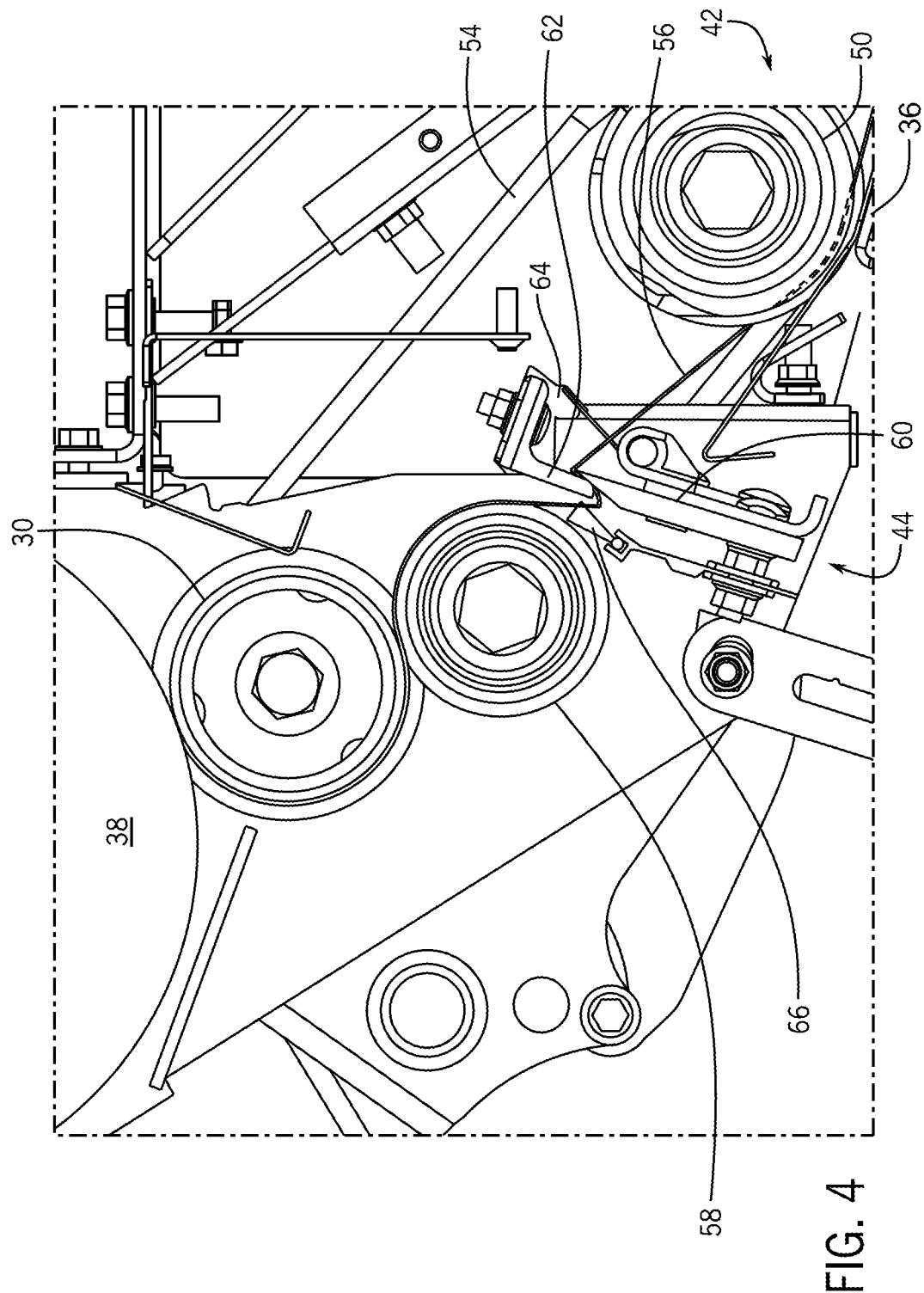
FIG. 4 is a partial right side internal view of the wrap material feed area of the baler of FIG. 1, with the counter-knife in a cutting position.

The material feed system 42 includes the feed roll 30, which is driven by the motor 46 (shown on the left side of the baler 10 in FIG. 2), which is operated by the controller 28 to feed material such as netting, from the material roll 38 when a bale is fully formed in the baling chamber 18 and a wrapping cycle is initiated. A gearbox 48 (also shown in FIG. 2), is provided to cause the feed roll 30 to rotate at a different speed than the output of the motor 46. Referring additionally to FIG. 4, a drive element embodied as a drive pulley 50 is provided on the right side of the baler 10, and is coupled in the material feed system 42 and with the motor 46 through the gearbox 48 and a shaft 52 (shown in FIG. 2), that extends across the baler 10. In other embodiments, the drive element may take other forms of rotating, drive imparting devices such as gears, sprockets, or others. A linking element, in this example a belt 54, links the drive pulley 50 and the feed roll 30. In other examples, the linking element may take another form that links the drive element with the feed roll 30, or such as in the case of gears, may be omitted. In this example, the belt 54 is configured to be provided with slack for interrupting rotation of the feed roll 30, and to be tensioned to drive the feed roll 30 when desired as further described below. Material, in this example netting 56 is unrolled from the material roll 38 by the feed roll 30 and passes between the feed roll 30 and a secondary roll 58. In this example, the secondary roll 58 is a steel roll that directs the material through the knife mechanism 44 and toward the net pan 36.

The knife mechanism 44 includes a fixed knife 60, which in this example is fastened to the baler 10 in a fixed position and includes a sharp edge for cutting the netting 56. The fixed knife 60 extends laterally across the baler 10 a distance that spans the width of the netting 56. The knife mechanism 44 also includes a counter-knife 62 that is moveable in generally up and down directions through operation of a link 80 (shown in FIG. 6) as further described below. The counter-knife 62 is configured as an angled bar extending laterally across the baler 10 parallel to the fixed knife 60. In the view of FIG. 4, the knife mechanism 44 is shown moved into a cutting position, with the counter-knife 62 lowered and intersecting the feed path 40 of the netting 56. Lowering the counter-knife 62 forces the netting 56 against the sharp edge of the fixed knife 60. A brush 66 is positioned to brush against the secondary roll 58 to remove any accumulated debris. After cutting, the cut edge of the netting that is still attached to the material roll 38 is directed between the knives 60, 62 after the counter-knife 62 is moved upward and a feed cycle is initiated.

Figure 5:
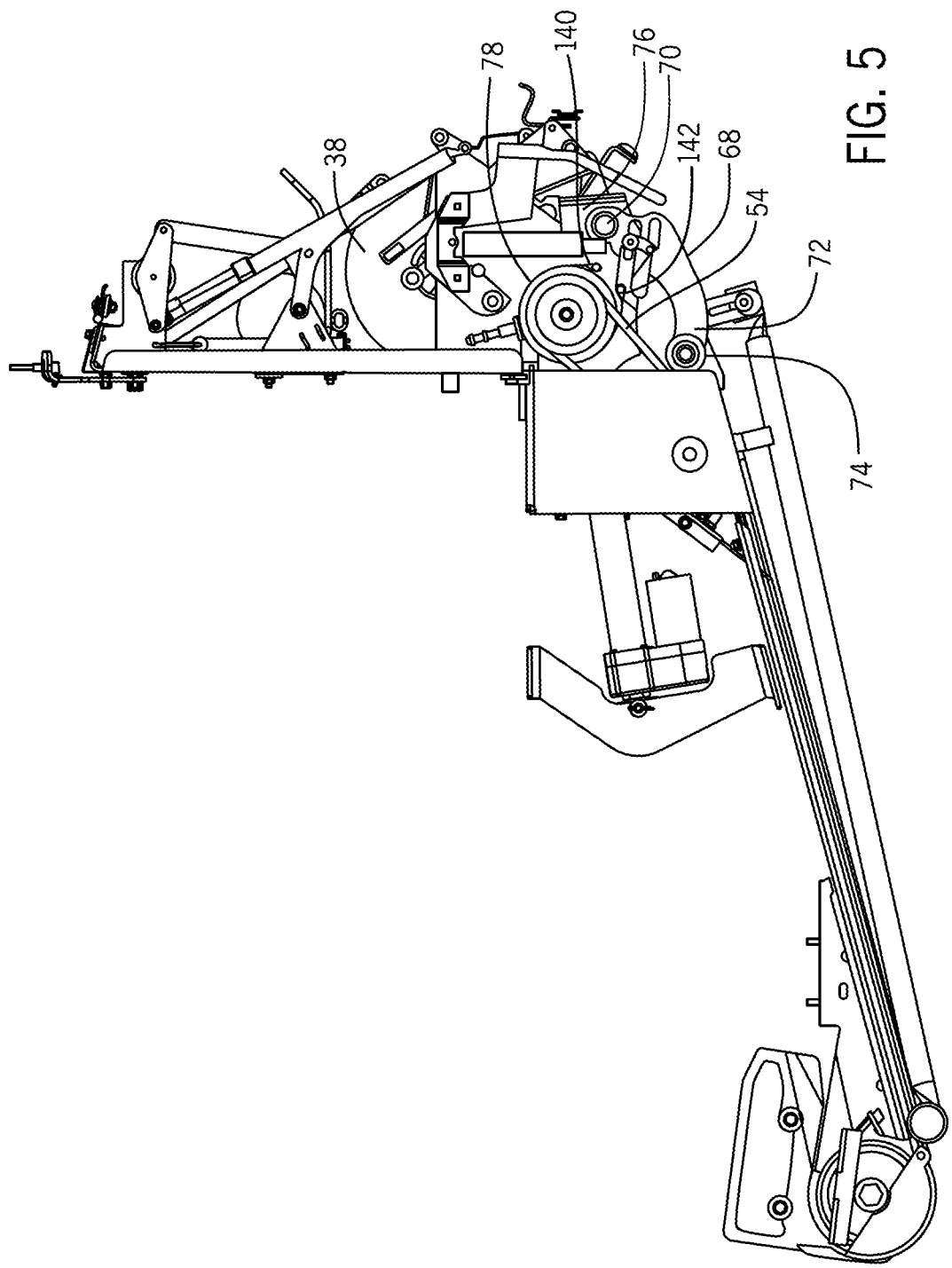
FIG. 5 is a left side elevational view of the wrap material feed area of the baler of FIG. 1, with the counter-knife in a cutting position.

Referring to FIG. 5, the material wrap system 24 is shown from the left-hand side of the baler 10. A tensioning arm 68 is supported on a shaft 70 and extends generally therefrom to an end 72 that carries an idler roller 74. The shaft 70 extends through a structural member 76 for support on the frame 20 of the baler 10. The idler roller 74 is positioned as shown in FIG. 5 so that the belt 54 is in a slack state where the belt 54 slips over the feed roll 30 and/or the drive pulley 50. As a result, the feed roll 30 is stationary and not feeding material from the material roll 38. A brake 78 engages the feed roll 30 to hold it in position as the slacked belt 54 is in a slip condition. The idler roller 74 is positioned to contact the belt 54 when the tensioning arm 68 is rotated clockwise from the position of FIG. 5 to apply tension to the belt 54 and in coordination with a release of the brake 78, to engage rotation of the feed roll 30 and thereby the material roll 38, for feeding the netting 56.

Figure 6:
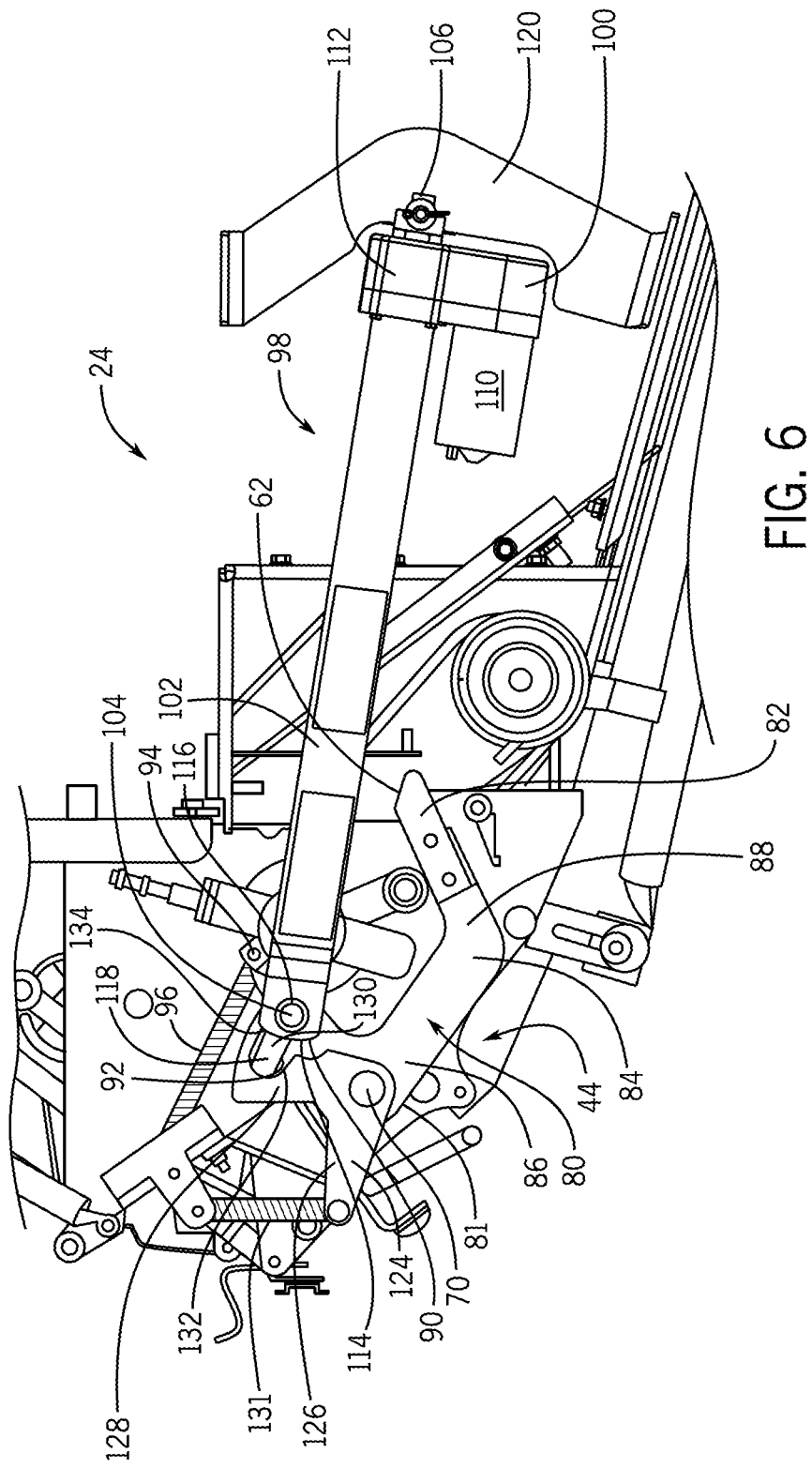
FIG. 6 is a view of the area indicated as 6-6 in FIG. 3.

Referring additionally to FIG. 6, where the material wrap system 24 is also shown from the right-hand side, the shaft 70 also serves as a pivot for a link 80 of the knife mechanism 44. The link 80 includes a pivot end 81 at the shaft 70 and extends to a counter-knife end 82. The counter-knife 62 is connected with the link 80 at the counter-knife end 82 so that the counter-knife 62 is moved generally up and down as the link 80 is rotated/pivoted about the shaft 70. The link 80 includes an arm 84 with a descending segment 86 leading from the pivot end 81 and at an elbow that joins the descending segment 86 with an ascending segment 88. The ascending segment 88 extends from the descending segment 86 at the elbow to the counter-knife end 82. The descending and ascending segments 86, 88 join at an obtuse angle at the elbow, resulting in the generally up and down movement of the counter-knife 62 when the link 80 pivots. It should be understood that the movement of the counter-knife 82 may have some arc as a result of pivoting movement about the shaft 70. In the current example, the link 80 is not fixed to the shaft 70, but instead rotates/pivots about the shaft 70. The link 80 also includes a plate 90 that extends generally upward from the shaft 70 and is broadened to define a slot 92 used in operation of the counter-knife 62 as further described below. The plate 90 also has a finger 94 to which a spring 96 is connected and which biases the link 80 in a counter-clockwise direction as viewed in FIGS. 3 and 6. Accordingly, the spring 96 urges the counter-knife 62 in an upward direction away from the cutting position of FIG. 6.

In FIGS. 3, 4 and 6, the counter-knife 62 is shown lowered to the cutting position by operation of an actuator 98 of the actuator system 45. The link 80 operates to link the counter-knife 62 with the actuator 98. The actuator 98 generally includes a drive unit 100, an arm 102, a pin 104, and a tension limiter 106. The drive unit 100 is configured as a linear actuator including an electric (or other) motor 110, operating to intermittently extend or retract a screw unit 112 to translate the arm 102 linearly. In other examples, a different type of mechanism may be used in the drive unit 100 to convert rotary motion to linear motion, or to provide linear motion for the arm 102. The arm 102 extends from the drive unit 100 to an actuator end 114, which has an opening through which the pin 104 extends. The pin 104 also extends through the slot 92 and is free to move through the slot 92 from the end 116 to the end 118, as moved by translation of the arm 102. As shown in FIGS. 3 and 6, the actuator 98 has operated the screw unit 112 in retraction mode to translate the arm 102 to the right (as viewed), so that the pin 104 is positioned against the end 116 of the slot 92. This action rotates the link 80 against the load applied by the spring 96, stretching the spring 96 and lowering the counter-knife 62 to the cutting position, as also shown in FIG. 4. The actuator 98 is mounted to a support 120 that is secured to the structural frame 20 of the baler 10, and against which the drive unit 100 reacts as the arm 102 is translated.

Also shown in FIGS. 3 and 6, is a tensioning lever 124 that is mounted to pivot/rotate about the shaft 70. The shaft 70 is fixed to the tensioning lever 124 and to the tensioning arm 68 (shown in FIG. 5), so that when the tensioning lever 124 is moved by the actuator 98, the shaft 70 rotates, pivoting the tensioning arm 68. The tensioning lever 124 includes a pair of arms 126, 128 each of which extends from the area of the shaft 70 and which may be disposed approximately ninety-degrees from one another, and may be arranged similar to a bell-crank. The arm 126 is connected with a spring 131, the other end of which is fixed to the structure of the baler 10, biasing the tensioning lever 124 in a clockwise direction as viewed in FIG. 3. This biases the tensioning arm 68 in the counter-clockwise direction (as viewed in FIG. 5), to relieve tension from the belt 54. The arm 128 includes a catch 130 which is configured as a slot with a closed end 132 and an open end 134. The catch 130 is configured to receive/catch the pin 104 when the arm 102 is sufficiently extended by the actuator 98, and to release the pin 104 when the arm 102 is retracted by the actuator 98.

Figure 7:
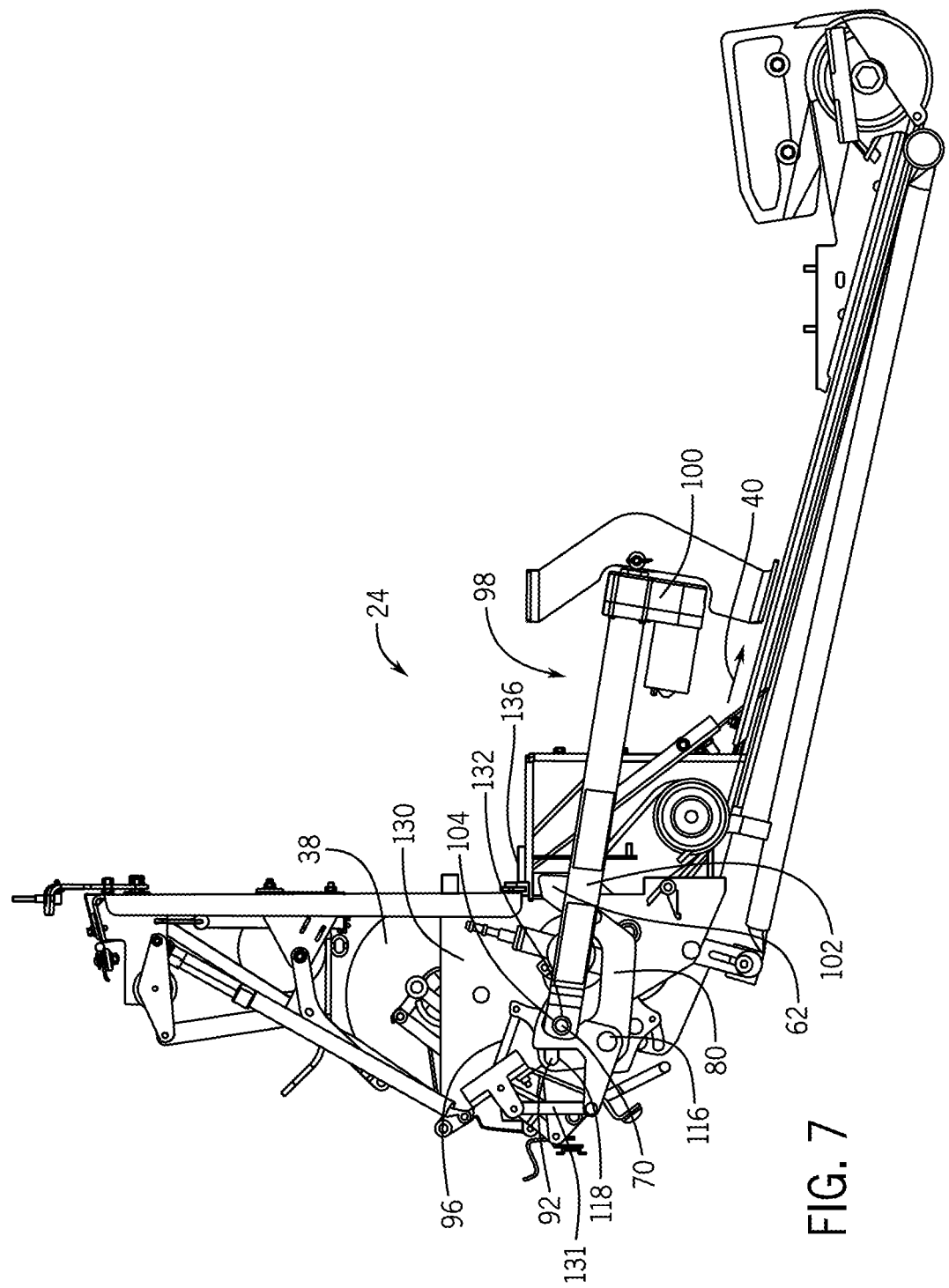
FIG. 7 is a right side elevational view of the wrap material feed area of the baler of FIG. 1, with the counter-knife in a full-up position.
Figure 8:
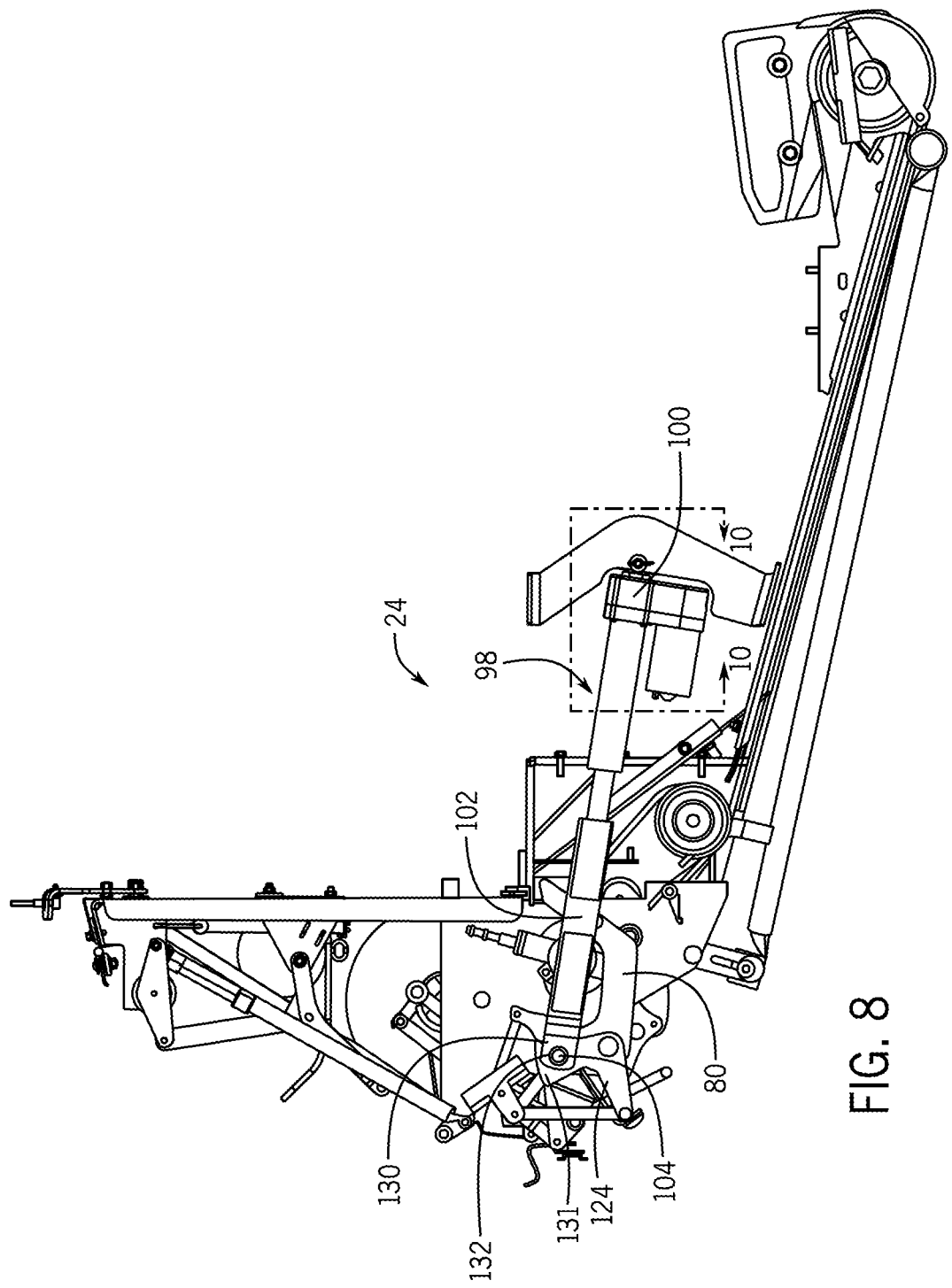
FIG. 8 is a right side elevational view of the wrap material feed area of the baler of FIG. 1, with the tensioner actuated to a tension position.
Figure 9:
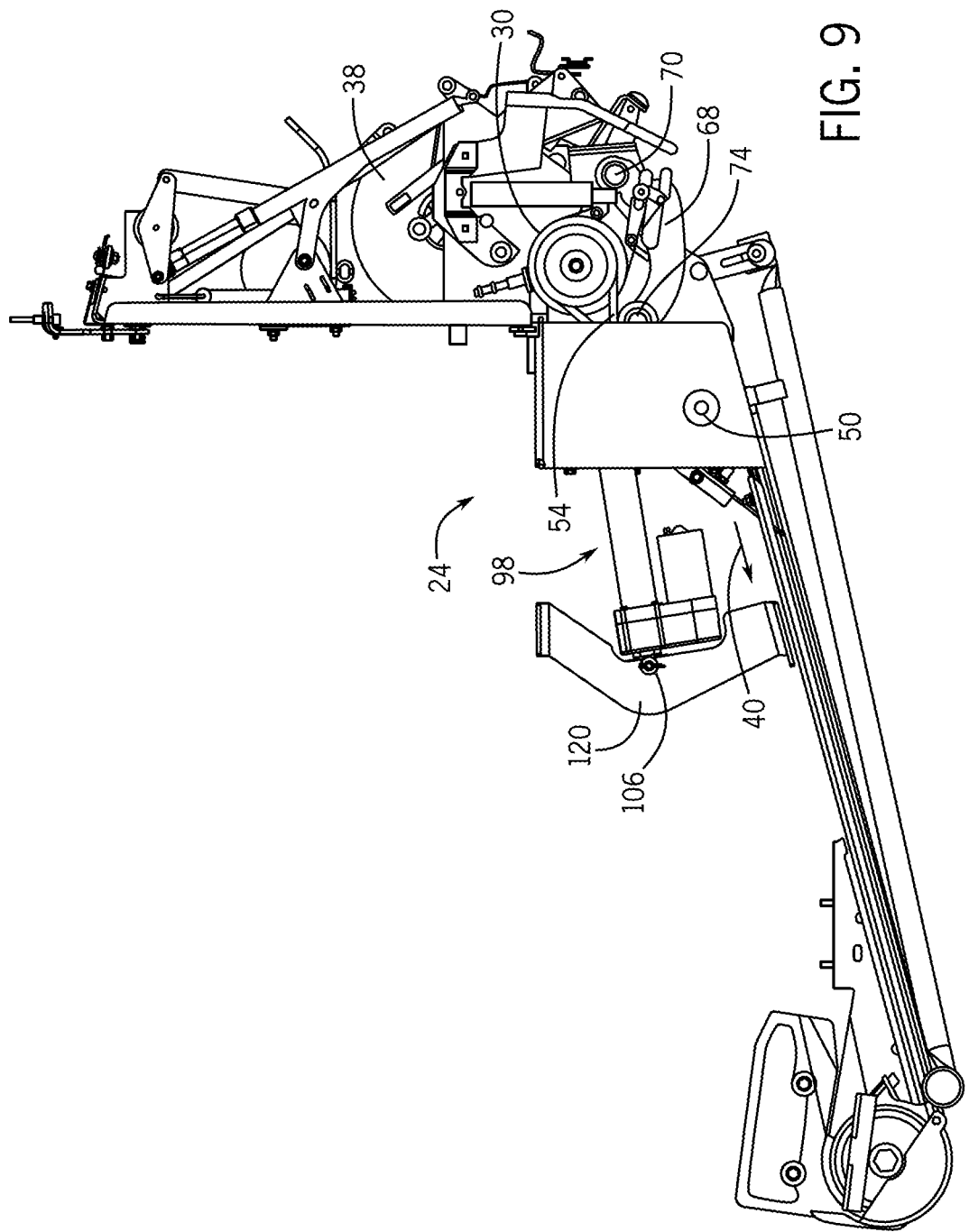
FIG. 9 is a left side elevational view of the wrap material feed area of the baler of FIG. 1, with the tensioner actuated to a tension position.

To initiate a material feed cycle, the actuator 98 is operated to extend the arm 102, which allows the link 80 to rotate/pivot under operation of the spring 131. Movement of the link 80 moves the counter-knife 62 upward to a full up position as shown in FIG. 7. The counter-knife 62 is now out of the net feed path 40 and may hit an up-stop 136. At this stage, the pin 104 has not yet moved through the slot 92, at least not significantly, and is located at, or near, the end 116 (the right end of slot 92 as viewed in FIG. 7). The pin 104 has entered the catch 130 of the tensioning lever 124 and is positioned at, or near, the closed end 132. As a result, the feed roll 30 is not yet rotating and is not feeding netting from the material roll 38. As operated by the material feed system 42, this ensures material feed is not initiated until after the counter-knife 62 is fully raised. Further extension of the arm 102 by operation of the drive unit 100 moves the pin 104 through the slot 92 away from the end 116 and toward the end 118 as viewed in FIG. 8, with the link 80 held from rotating. As the actuator 98 continues to move the arm 102, the pin 104 applies force to the tensioning lever 124 at the closed end 132 of the catch 130, rotating the tensioning lever 124 counter-clockwise (as viewed in FIG. 8), against the force of the spring 131 moving from the position of FIG. 7 to the position of FIG. 8 to tension the belt 54. The left-hand view of FIG. 9 demonstrates operation of the actuator 98 to extend the arm 102 not only rotates the tensioning lever 124 but also rotates the tensioning arm 68 via the shaft 70, to which both are connected. Rotation of the tensioning arm 68 forces the idler roller 74 against the belt 54 removing slack. The belt 54, engaged with the drive pulley 50 (FIG. 4), and therethrough with the motor 46 (FIG. 2), begins to rotate. This turns the feed roll 30 and the material roll 38, against which the feed roll 30 is engaged, feeding netting 56 through the feed path 40.

In general, when the tension on the belt 54 is sufficiently increased, the feed roll 30 rotates to move the netting 56 toward the bale formed in the baling chamber 18 (FIG. 2). As the netting 56 is fed by the feed roll 30 (powered by the motor 46), toward the baling chamber 18, the bale within the baling chamber 18 continues to rotate. Accordingly, when the netting 56 is engaged by the bale, the rotation of the bale pulls the netting 56 at a speed corresponding to the tangential speed of the radially outermost edge of the bale (i.e., the point at which the netting 56 engages the bale). This can be used to apply a stretch to the netting 56 to compress the bale. The motor 46, as controlled by the controller 28 is operated to ensure that appropriate tension is applied to the netting 56 during a wrapping operation, such as through a speed difference between the netting 56 engaging the bale and the netting 56 passing (or being moved) by the feed roll 30.

Figure 10:
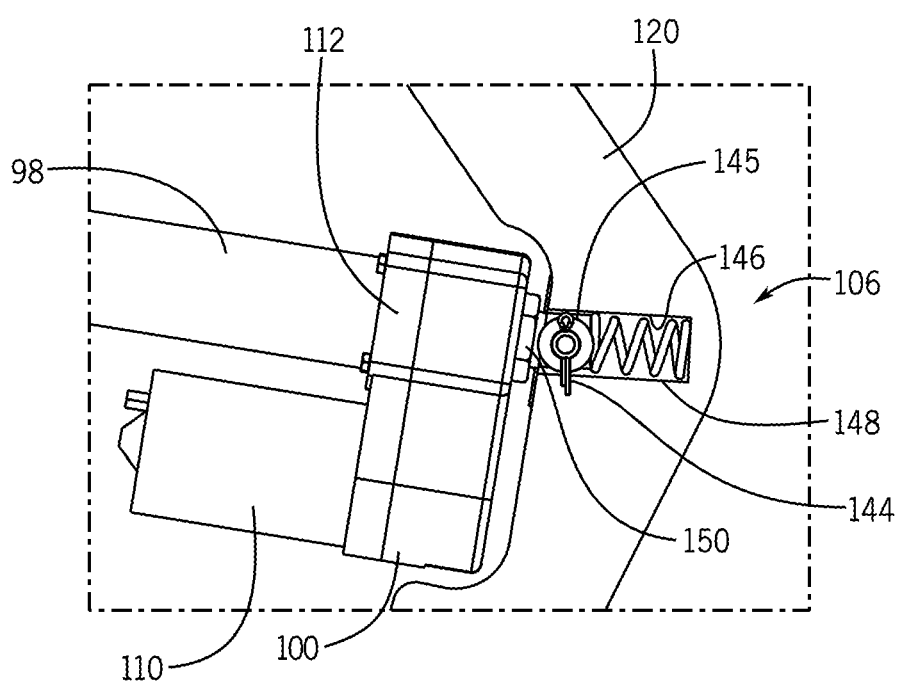
FIG. 10 is a view of the area indicated as 10-10 in FIG. 8.

As the tension is applied to the belt 54, the tension limiter 106 operates to ensure the belt 54 is not over-tensioned while concurrently applying sufficient tension to ensure the bale is wrapped tightly. Referring to FIG. 10, the actuator 98 includes an eyelet 145 through which a pin 144 extends to couple the actuator 98 with the support 120. The pin 144 passes through a lost-motion cavity 146 formed by the support 120. The lost motion cavity 146 contains a spring 148 that biases the pin 144 and the actuator 98 toward the tensioning lever 124. The support 120 includes a stop 150 that limits movement of the actuator 98 and sets the nominal position of the pin 144 as against the stop 150, where it is held unless the spring 148 is compressed. The amount of tensioning force on the belt 54 as applied by the idler roller 74 is limited by the spring 148. If the tension limit is reached, the spring 148 compresses, and further extension of the arm 102 by the actuator 98 does not result in further rotation of the tensioning lever 124, but in movement of the actuator 98 as the spring 148 compresses. In particular, the spring 148 compresses when, via the idler roller 74, the tensioning arm 68, and the shaft 70, the tensioning lever 124 provides a resistance to rotation above a threshold magnitude so that the belt 54 is not over tensioned. As a result, proper tension is applied to the belt 54, without over tensioning. Inclusion of the tension limiter 106, obviates the need to manually adjust the tensioning mechanism to apply the proper tension, which might otherwise be challenging and time consuming to accomplish.

Once the bale is sufficiently wrapped, the actuator 98 is operated to withdraw the arm 102 and the tensioning lever 124. The tensioning arm 68 also moves with aid of the spring 131, backing the idler roller 74 off the belt 54 relieving tension and stopping rotation of the feed roll 30. Simultaneously, the brake 78 is applied as shown in FIG. 5. In the current example, the brake 78 is a band brake with a fixed end 140 and a moveable end 142 connected with the tensioning arm 68. Accordingly, as the tensioning arm 68 moves to slacken the belt 54, it also moves the end 142 to apply the brake 78 ensuring that material feed stops. While tension is removed from the belt 54, the counter-knife 62 remains in the full up position until material feed stops. Once the belt tension is fully removed, further withdrawal of the arm 102 then moves the counter-knife 62 downward overcoming the force of the spring 96. The counter-knife 62 intersects the feed path 40 as shown in FIG. 4 cutting the netting 56 in cooperation with the fixed knife 60.

Through the material wrap system described herein, motions of the tensioning mechanism and of the knife mechanism are separated, while both are operated by a single actuator. In addition, force output of the actuator is limited to avoid over tensioning. Tension adjustment is simplified because the tension limiter ensures the proper tension is applied, and also provides compensation for any variations in actuator output. In addition, material feed is controlled to avoid misfeeds such as feeding material before the counter-knife is moved out of the material path.

Also, the following examples are provided, which are numbered for easier reference.

1. A system for wrapping a material, comprising: a feed element configured to feed the material through a feed path; a drive element configured to intermittently drive the feed element; a linking element configured to couple the drive element with the feed element; a tensioning lever configured to vary tension on the linking element to intermittently drive or not drive the feed element; a knife mechanism configured to intersect the feed path to cut the material; and an actuator engageable with the tensioning lever and with the knife mechanism, the actuator configured to move the tensioning lever and the knife mechanism independent of one another.

2. The system of example 1, comprising a pivot, wherein the knife mechanism includes a link coupled with the actuator, the link and the tensioning lever both being rotatable about the pivot.

3. The system of example 2, wherein the link defines a slot and the actuator includes a pin that extends through, and is moveable within, the slot.

4. The system of example 3, wherein the tensioning lever defines a catch, wherein the pin is engageable in the catch.

5. The system of example 3, wherein the slot includes a first end and a second end, wherein the pin is configured to move within the slot from the first end and toward the second end, to apply tension through the tensioning lever without moving the link.

6. The system of example 3, wherein the pin is configured to disengage from the catch to move the link without moving the tensioning lever.

7. The system of example 1, wherein the actuator includes an actuator arm and comprising: a support defining a lost-motion cavity into which the actuator arm extends; and a spring extending into the lost-motion cavity and biasing the actuator arm toward the tensioning lever.

8. The system of example 7, wherein the spring is configured to compress when the tensioning lever provides a resistance to rotation above a threshold magnitude so that the linking element is not over tensioned.

9. The system of example 1, comprising: a material roll in which the material is stored, the feed element engaging the material roll; and a baling chamber configured to form a bale, and into which the material is fed by the feed element to wrap the bale.

10. The system of example 9, wherein the actuator is configured to place the knife mechanism at a stop position out of the feed path before actuating the tensioning lever to initiate drive of the feed element to feed the material into the baling chamber.

11. A system for wrapping a material, comprising: a feed roll configured to feed the material through a feed path; a drive pulley configured to intermittently drive the feed roll; a belt configured to couple the drive pulley with the feed roll; a tensioning lever rotatable about a pivot and configured to vary tension on the belt to intermittently drive or not drive the feed roll, the tensioning lever defining a catch opening; a knife mechanism including a fixed knife, and a counter-knife; a link configured to move the counter-knife relative to the fixed knife, the link defining a counter-knife slot; and an actuator including an actuator arm having an actuating end with a pin, and the actuator including a drive unit configured to bi-directionally drive the actuator arm to move the actuating end, wherein the pin is engageable with the tensioning lever at the catch opening and extends through the counter-knife slot of the link.

12. The system of example 11, wherein the pin is moveable within, the counter-knife slot.

13. The system of example 12, comprising a roller coupled with the tensioning lever and configured to engage the belt.

14. The system of example 12, wherein the counter-knife slot includes a first end and a second end, wherein the pin is configured to move within the counter-knife slot from the first end and toward the second end, to apply tension to the belt through the tensioning lever without moving the link.

15. A system for wrapping a material, comprising: a feed roll configured to feed the material through a feed path; a drive element configured to intermittently drive the feed roll; a linking element configured to couple the drive element with the feed roll; a tensioning lever rotatable about a pivot and configured to vary tension on the linking element to intermittently drive or not drive the feed roll, the tensioning lever including a first arm that extends from the pivot and that defines a catch opening and including a second arm that extends from the pivot; a knife mechanism including a fixed blade, and a counter-knife mechanism; wherein the counter-knife mechanism includes: a link with a counter-knife end and a pivot end, the link rotatable about the pivot and defining a counter-knife slot; and a counter-knife coupled with the counter-knife end; an actuator including an actuator arm having a first end with a pin and a second end, the actuator including a drive unit configured to bi-directionally drive the actuator arm, the pin engageable with the tensioning lever and extending through the counter-knife slot of the link, the actuator configured to move the tensioning lever and the link independent of one another; a support defining a lost-motion cavity into which the second end of the actuator arm extends; and a spring extending into the lost-motion cavity and biasing the actuator arm toward the tensioning lever, the spring configured to compress when the tensioning lever provides a resistance to rotation above a threshold magnitude so that the linking element is not over tensioned.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A system for wrapping a material, comprising:
    a feed element configured to feed the material through a feed path;
    a drive element configured to intermittently drive the feed element;
    a linking element configured to couple the drive element with the feed element;
    a tensioning lever configured to vary tension on the linking element to intermittently drive or not drive the feed element;
    a knife mechanism configured to intersect the feed path to cut the material;
    an actuator engageable with the tensioning lever and with the knife mechanism, the actuator including an actuator arm and configured to move the tensioning lever and the knife mechanism independent of one another;
    a support defining a lost-motion cavity into which the actuator arm extends; and
    a spring extending into the lost-motion cavity and biasing the actuator arm toward the tensioning lever.

2. The system of claim 1, comprising at least one pivot, wherein the knife mechanism includes a link coupled with the actuator, the link and the tensioning lever both being rotatable about the at least one pivot.

3. The system of claim 2, wherein the link defines a slot and the actuator includes a pin that extends through, and is moveable within, the slot.

4. The system of claim 3, wherein the tensioning lever defines a catch, wherein the pin is engageable in the catch.

5. The system of claim 4, wherein the pin is configured to disengage from the catch to move the link without moving the tensioning lever.

6. The system of claim 3, wherein the slot includes a first end and a second end, wherein the pin is configured to move within the slot from the first end toward the second end, to apply tension through the tensioning lever without moving the knife mechanism.

7. The system of claim 1, wherein the spring is configured to compress when the tensioning lever provides a resistance to rotation above a threshold magnitude so that the linking element is not over tensioned.

8. The system of claim 1, comprising:
    a material roll in which the material is stored, the feed element engaging the material roll; and
    a baling chamber configured to form a bale, and into which the material is fed by the feed element to wrap the bale.

9. The system of claim 8, wherein the actuator is configured to place the knife mechanism at a stop position out of the feed path before actuating the tensioning lever to initiate drive of the feed element to feed the material into the baling chamber.

10. A system for wrapping a material, comprising:
    a feed roll configured to feed the material through a feed path;
    a drive pulley configured to intermittently drive the feed roll;
    a belt configured to couple the drive pulley with the feed roll;

a tensioning lever rotatable about a pivot and configured to vary tension on the belt to intermittently drive or not drive the feed roll, the tensioning lever defining a catch opening;

a knife mechanism including a fixed knife, and a counter-knife;

a link configured to move the counter-knife relative to the fixed knife, the link defining a counter-knife slot; and an actuator including an actuator arm having an actuating end with a pin, and the actuator including a drive unit configured to bi-directionally drive the actuator arm to move the actuating end, wherein the pin is engageable with the tensioning lever at the catch opening and extends through the counter-knife slot of the link.

11. The system of claim 10, wherein the pin is moveable within the counter-knife slot.

12. The system of claim 11, comprising a roller coupled with the tensioning lever and configured to engage the belt.

13. The system of claim 11, wherein the counter-knife slot includes a first end and a second end, wherein the pin is configured to move within the counter-knife slot from the first end toward the second end, to apply tension to the belt through the tensioning lever without moving the link.

14. The system of claim 11, wherein the pin is configured to disengage from the catch opening to move the link without moving the tensioning lever.

15. The system of claim 10, comprising:
a support defining a lost-motion cavity into which the actuator arm extends; and
a spring extending into the lost-motion cavity and biasing the actuator arm toward the tensioning lever.

16. The system of claim 15, wherein the spring is configured to compress when the tensioning lever provides a resistance to rotation above a threshold magnitude so that the belt is not over tensioned.

17. The system of claim 10, comprising:
a material roll in which the material is stored, the feed roll engaging the material roll; and
a baling chamber configured to form a bale, and into which the material is fed by the feed roll to wrap the bale.

18. The system of claim 17, wherein the actuator is configured to place the counter-knife at a stop position out of the feed path before actuating the tensioning lever to initiate drive of the feed roll to feed the material into the baling chamber.

19. A system for wrapping a material, comprising:
a feed roll configured to feed the material through a feed path;
a drive element configured to intermittently drive the feed roll;
a linking element configured to couple the drive element with the feed roll;
a tensioning lever rotatable about a pivot and configured to vary tension on the linking element to intermittently drive or not drive the feed roll, the tensioning lever including a first arm that extends from the pivot and that defines a catch opening and including a second arm that extends from the pivot;
a knife mechanism including a fixed blade, and a counter-knife mechanism;
wherein the counter-knife mechanism includes:
a link with a counter-knife end and a pivot end, the link rotatable about the pivot end and defining a counter-knife slot; and
a counter-knife coupled with the counter-knife end;
an actuator including an actuator arm having a first end with a pin and a second end, the actuator including a drive unit configured to bi-directionally drive the actuator arm, the pin engageable with the tensioning lever and extending through the counter-knife slot of the link, the actuator configured to move the tensioning lever and the link independent of one another;
a support defining a lost-motion cavity into which the second end of the actuator arm extends; and
a spring extending into the lost-motion cavity and biasing the actuator arm toward the tensioning lever, the spring configured to compress when the tensioning lever provides a resistance to rotation above a threshold magnitude so that the linking element is not over tensioned.

* * * * *